United States Patent [19]
Swinson et al.

[11] Patent Number: 5,546,801
[45] Date of Patent: Aug. 20, 1996

[54] WATER FLOW METER ADAPTER FOR RESIDENTIAL FIRE SERVICE SPRINKLER SYSTEMS

[75] Inventors: Thierry W. Swinson, Wetumpka; Brent M. Walden, Montgomery, both of Ala.

[73] Assignee: Schlumberger Industries, Inc., Norcross, Ga.

[21] Appl. No.: 252,353

[22] Filed: Jun. 1, 1994

[51] Int. Cl.$^6$ .............................. G01F 3/08; G01F 15/14
[52] U.S. Cl. ................................................. 73/273; 73/238
[58] Field of Search ........................... 73/273, 238, 202; 239/209, 74

[56] References Cited

U.S. PATENT DOCUMENTS

| | | | |
|---|---|---|---|
| 1,827,230 | 10/1931 | Haase | 73/273 |
| 3,523,455 | 8/1970 | Branitzky | 73/273 |
| 3,559,482 | 2/1971 | Baker et al. | 73/202 |
| 5,333,496 | 8/1994 | Fenelon | 73/202 |

*Primary Examiner*—Richard Chilcot
*Assistant Examiner*—Harshad Patel
*Attorney, Agent, or Firm*—Keith G. W. Smith

[57] ABSTRACT

An adapter for a meter chamber provides proportional metering of a flow through a maincase that is sufficiently accurate at large flow rates to avoid the unmetered loss of significant quantities of water. An essentially unobstructed passageway is provided under the meter chamber to provide a free flow of water through a path that can be made large enough to avoid flow blockage by debris, even if the path through the meter becomes blocked. Thus, the adapter is particularly useful for installation in residential fire service mains. The adapter includes a chamber housing into which the meter chamber may be inserted, a bypass plate to hold the meter chamber in place, and a bypass to provide the passageway through which the free flow of water flows. The chamber housing includes inlet and outlet apertures, as does the bypass. The bypass plate separates a passageway including the meter chamber from the essentially unobstructed passageway, and the chamber housing is arranged so that essentially all of the water entering the passageway in which the meter is positioned flows through the meter chamber. A register on a maincase in which an adapter containing a positive displacement meter chamber is provided may be calibrated to accurately register the volume of water flowing through both chambers of the adapter at significant flow rates. The adapter thus transforms a positive displacement meter chamber housed within into a proportional flow meter.

18 Claims, 7 Drawing Sheets

WATER FLOW METER ADAPTER FOR RESIDENTIAL FIRE SERVICE SPRINKLER SYSTEMS

FIELD OF THE INVENTION

The present invention relates to devices and methods for metering a flow of water and more particularly to devices and methods for adapting existing water flow meters for use in metering water in residential and other fire service sprinkler systems.

BACKGROUND OF THE INVENTION

In 1973, a presidential commission issued a report that suggested the installation of fire sprinkler systems in all residential buildings to reduce fire-related deaths. Today, fire marshalls across America are beginning to require residential sprinkler systems in apartments, duplex homes, and other buildings to protect both fire and property. The installation of such systems is particularly important in multiunit structures, where a fire may begin in one residence and pass quickly to another due to the adjoining structure. However, in any densely populated area, a large fire may spread from home to home, and in sparsely populated areas, the distribution or lack of adequate fire fighting equipment may increase the hazards and losses should a fire become started. Thus, residential sprinkler systems are desirable in all types of residential buildings.

The installation of residential sprinkler systems also saves money. Many insurance companies offer lower rates for homes having installed sprinkler systems, particularly for larger homes in those rural areas that have substandard fire fighting ability. In such cases, a fire sprinkler system will recover its cost in less than two years. In cities, city engineers can allow developers to install smaller fire lines and plugs if fire sprinkler systems are installed in residential housing, thus lowering the construction cost of the entire neighborhood.

However, the use of residential lines for fire protection is not completely devoid of concerns for utility companies. Utility companies will be held accountable if any utility owned product restricts water flow to a fire protection sprinkler system. On the other hand, these same companies are under pressure to meter and bill all water lines in order to increase revenue and decrease losses caused by unmetered water. Prior art meters that are used in conventional ways to meter water are vulnerable to blockages should, for example, a small stone become lodged in the measuring chamber of the meter. In such a case, the water flow stops just as though a valve was shut. As can readily be appreciated, the consequences of such a blockage in a fire sprinkler system can be serious or even catastrophic.

The NFPA (National Fire Protection Association) promulgates standards for residential fire lines in NFPA 13R, which is adopted as a regulation in most areas in the United States. This standard requires residential fire lines to provide 13 gallons per minute (gpm) to 4 sprinkler heads, or a total of 52 gpm, which typically is met through the installation of 1" (one inch) fire lines. Utility companies presently have two alternatives to prevent the unmetered flow of water through these fire lines—water flow detectors and 1" positive displacement meters. Water flow detectors are devices that alarm the fire department when a flow is detected, which may indicate either the start of a fire or the use of unmetered water. Their cost is justified in low volume commercial applications, but the devices can become costly in high volume residential neighborhoods and unruly because of false alarms. However, most utility companies are installing 1" positive displacement meters to record consumption up to 52 gpm instead of a water flow detector. These meters may be subject to blockage in critical situations.

It would thus be advantageous to provide a residential fire service metering device and method that can retrofit existing 1" (and other size) fire lines, and that avoids flow blockages caused by debris. Such a metering device and method should also have low head loss to prevent flow reduction, be able to (at least) register flow if a home owner taps into a fire line and meter water sufficiently accurately at high flow rates to avoid giving away large amounts of free water, and be reasonably priced for large volume residential applications.

SUMMARY OF THE INVENTION

In accordance with the invention, there is thus provided an assembly to convert a standard inexpensive positive displacement meter into a proportional meter, comprising a chamber housing for a preassembled meter chamber, a bypass plate, and a bypass for mounting within a maincase. The bypass and bypass plate, in cooperation with one another, provide an essentially unrestricted flow path for water to flow through the maincase with little headloss. The chamber housing and bypass plate cooperate to form a flow path for a portion of the water entering and leaving the maincase, so that this portion may be metered by the positive displacement meter. The chamber housing is provided with a means for screening the inlet flow at the inlet side of the housing to prevent debris from reaching the inlet of the meter chamber.

The meter installed in the chamber housing provides proportional metering of the flow through the maincase that is sufficiently accurate at large flow rates to avoid the unmetered loss of significant quantities of water. The essentially unobstructed open space formed between the bypass and the bypass plate provides a free flow of water through a path that can be made large enough to avoid flow blockage caused by debris, even if the path through the meter becomes blocked. Moreover, inexpensive existing meter chambers designed for smaller maincases can be used in conjunction with the invention. For example, it is possible to use identical (or nearly identical) metering devices in both the ⅝" maincase provided for normal residential service and the 1" maincase for fire service sprinkler systems, if the meter chamber in the 1" maincase is installed with the inventive assembly.

It is thus an object of the invention to provide a device that can retrofit an existing maincase in a fire line to permit the installation of a meter to detect and meter the flow of significant quantities of water, while allowing at least a portion of the flow to a sprinkler system to be essentially unobstructed.

It is a further object of the invention to provide a device for allowing the installation of a meter chamber in a maincase with little resulting head loss, should the flow path through the meter chamber become blocked.

It is a still further object of the invention to provide a device to permit the installation of a meter in a maincase so that a substantial flow of water can be supplied to a sprinkler system without the risk of flow blockage caused by debris.

It is yet another object of this invention to provide a device to allow standard, inexpensive meter chambers to be installed in a fire service line with little or no modification of the meter chamber, while meeting the standards required for fire protection.

These and other objects of the invention will become readily apparent to one skilled in the art upon study of the detailed description that follows.

DETAILED DESCRIPTION OF THE PREFERRED EMBODIMENT

Figure 1:
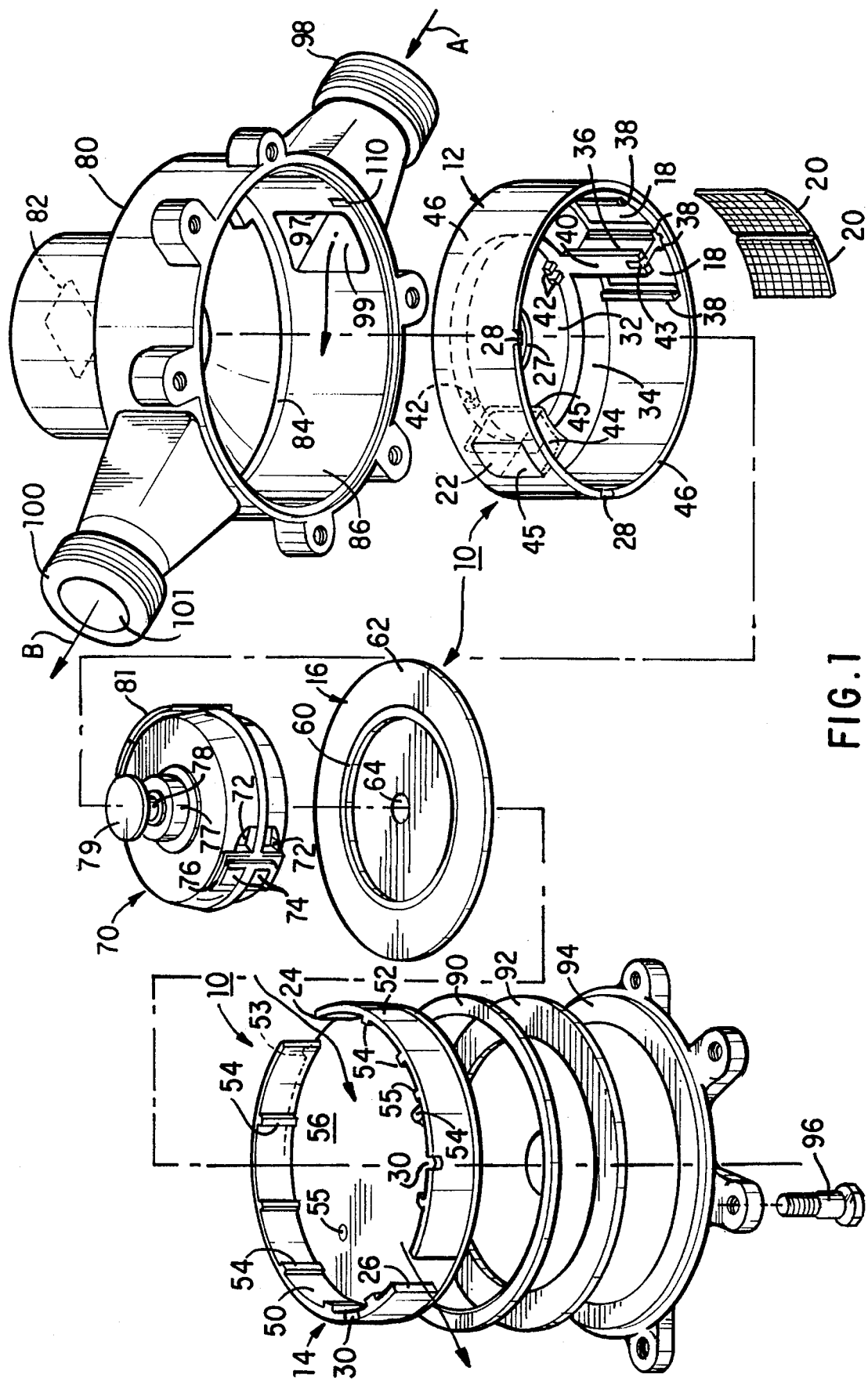
FIG. 1 is an exploded isometric view of a preferred embodiment of the inventive adaptor, in assembled form, showing its use in conjunction with a surrounding maincase and an enclosed meter chamber.

FIG. 1 shows an exploded isometric view of a preferred embodiment of the inventive adapter 10, in relation to a maincase and an installed meter chamber. Adapter 10 comprises a chamber housing 12, a bypass 14, and a bypass plate 16. Bypass plate 16 is sandwiched between chamber housing 12 and bypass 14 and serves to separate the assembled adapter 10 horizontally into two independent passageways. The upper passageway provides a housing for a meter of conventional design. The lower passageway provides an essentially unobstructed flow of water, as is required for a fire service sprinkler system.

When adapter 10 is installed in a maincase 80, the water flow generally follows a path indicated by arrows A and B, which represent flow from an inlet and to an outlet, respectively. At least one inlet opening, or more preferably, a pair of inlet openings 18 in the chamber housing proximate the water inlet indicated by arrow A provide means to divide the inlet flow of water into a first flow through the upper one of the two independent passageways. To protect a meter chamber disposed in the passageway from debris that may be present in the inlet water flow, filters or screens 20 may be provided to cover the inlet openings 18 as shown in FIG. 1. Water entering through inlet openings 18 flows through a meter chamber 70 that may be housed within the upper passageway, and after flowing through the meter, flows out through an outlet opening 22 disposed approximately opposite the inlet openings 18 in a radial direction and provided so that the outlet flow from the upper passageway can join the outlet flow from the lower passageway. An auxiliary opening 27 is provided in the top of chamber housing 12 in a preferred embodiment to allow a portion of a preferred conventional metering chamber to pass therethrough, as will be explained later. A small flow of water may pass through auxiliary opening 27, but the flow eventually fills an upper region in the maincase above the adapter. The water filling this region is essentially trapped and stagnant, and does not affect the operation of a meter chamber used in conjunction with the inventive adapter.

In use, a portion of the inlet water flow is divided into a second flow by inlet opening 24 in bypass 14. Water entering opening 24 flows essentially unimpeded through the lower passageway in adapter 10 and out through an outlet opening 26, where it merges with the flow of water exiting from outlet opening 22 to form the outlet flow generally indicated by arrow B. Means such as tabs 28 on chamber housing 12 and matching notches 30 on bypass 14 may be provided to maintain chamber housing 12 and bypass 14 in a fixed relationship when assembled. Preferably, chamber housing 12, bypass plate 16, and bypass 14 are comprised of plastic, both for ease of fabrication and to provide some flexibility to allow sealing engagement when pressure is applied. Other materials may also be used, but may require the use of gaskets to achieve proper sealing.

The top portion of chamber housing 12 is adapted to seat a conventional meter chamber and to be compressively engaged within a maincase. The preferred embodiment has a circular ceiling 32 having auxiliary opening 27, which, as previously described, provides an opening for a portion of a meter chamber to pass through. The diameter of circular ceiling 32 is selected to allow the assembled adapter 10 to fit within the required maincase and to tightly seat a conventional meter chamber 70 when the adapter 10 is assembled within the maincase 80. The preferred embodiment also has a shoulder 34 for compressional seating on an internal shoulder of a maincase, as will be described below.

Hooks or guides 38 are provided for attaching screens for filtering water entering through inlets 18 because the screening means conventionally provided with the metering chamber does not function in the larger enclosure provided by chamber housing 12 except to aid in positioning the meter chamber in the housing. Means, such as internal walls 36 and 40, together with engagement means, comprising notch 43 and seating means 42, are provided to engage and position a conventional metering chamber 70 (An additional seating means is on the opposite side of outlet 22 and is hidden from view in FIG. 1.). These engaging and positioning means, which are preferably integrally molded with chamber housing 12, may differ from those shown here, depending upon which meter chamber 70 is to be accommodated by the housing 12 and what corresponding means provided on the meter chamber 70 to hold and position it in place. An outlet channel, which, in the preferred embodiment, includes side walls 45 and bottom wall 44 as well as a portion of shoulder 34, provides fluid communication between the metering chamber and outlet 22. The chamber housing 12 also comprises an outer wall 46 upon which engagement means 28 are preferably provided. Bottom wall 44, guides 38, and walls 36, 40 are recessed somewhat from the rim of an enveloping outside wall 46 to allow a portion of outside wall 46 to form a lip for seating bypass plate 16.

In the preferred embodiment, bypass 14 comprises an essentially circular bottom plate 56 having semicircular vertical side walls 50 and 52 around its perimeter. Side walls 50 and 52 are preferably provided with ribs 54 extending slightly inward from walls 50 and 52. Ribs 54 serve as means for supporting bypass plate 16, which has slightly smaller diameter than bottom plate 56. It will be understood that ribs 54 permit bypass plate 16 to form an enclosed lower passageway with bypass 14 thus providing essentially unobstructed fluid communication between inlet 24 and outlet 26. It will further be understood that any other supporting means that allows for such unobstructed fluid communication may be substituted for ribs 54 within the spirit of the invention. Although the illustrated inlet and outlet arrangement is preferred, note that side walls 50 and 52 may also be considered as a single surrounding wall broken by openings for inlet 24 and outlet 26, thus suggesting other arrangements for these openings, such as windows that do not extend the full height of the single surrounding wall.

Figure 6:
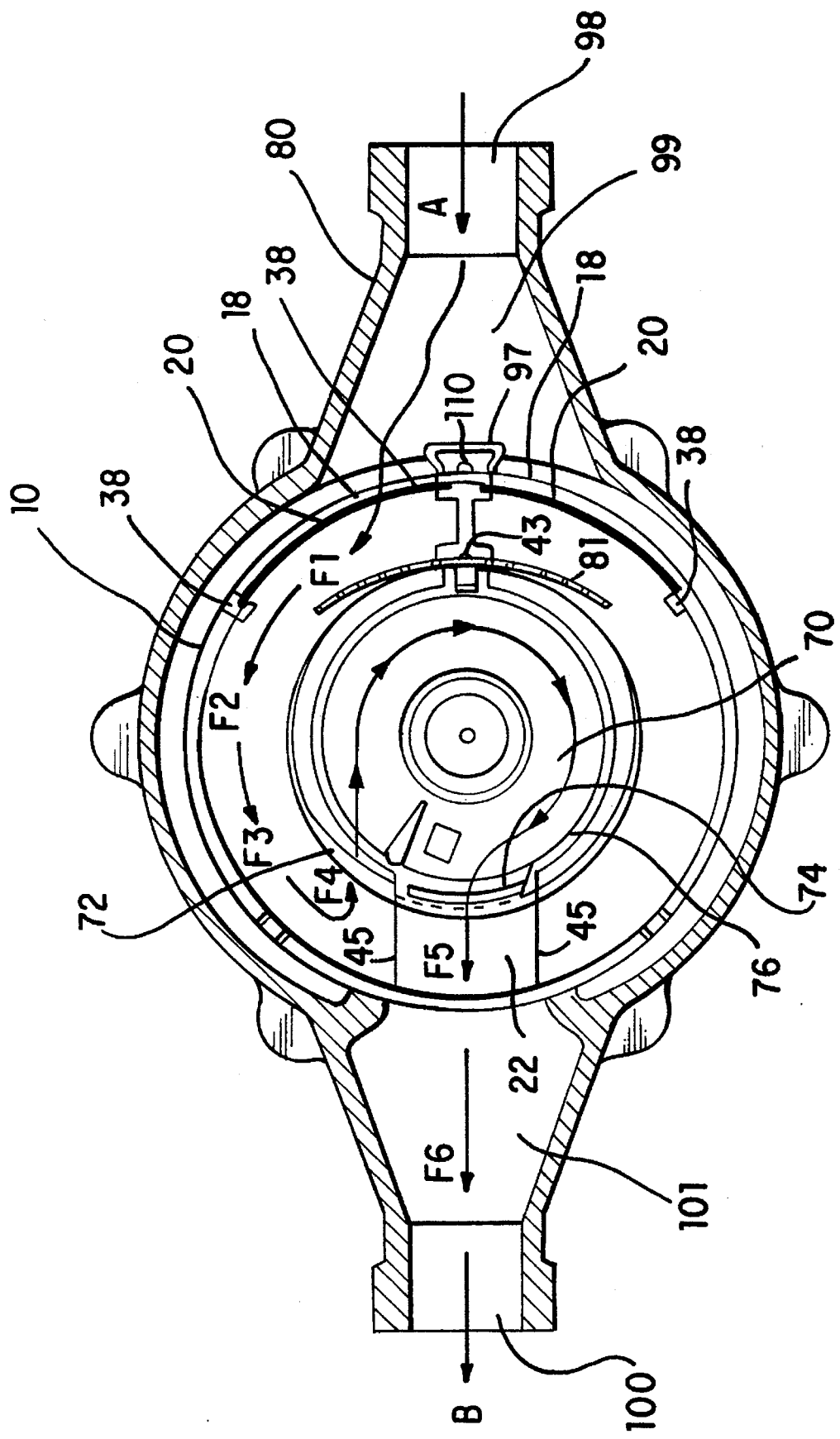
FIG. 6 is a cut-away view of the assembly shown in FIG. 3B along section line 6, showing the flow of water in the upper chamber of the adapter.

At least one, and preferably a plurality of vent holes 55 in bottom plate 56 are provided in the preferred plastic embodiment to prevent fatigue caused by fluid pressure from breaking the adapter; water released through these holes becomes trapped in a "dead" space between bottom plate 56 and a bottom cap of a maincase in an actual installation. Notches 30 are preferably provided in side walls 50, 52 to allow bypass 14 to engage the corresponding tabs 28 that are preferably provided in chamber housing 12 to prevent relative rotation between portions of the assembled adapter 10. A small projection or tab 53 is provided at one point along the outer perimeter of bottom plate 56. Referring briefly to FIG. 6, tab 53 mates with a corresponding notch 110 in a post 97 within a maincase 80 to prevent rotation of the assembled adapter 10 within maincase 80. Because of the presence of post 97, it is preferred that the inlet 24 of bypass 14 be offset to avoid being partially blocked by post 97 when adapter 10 is installed. By being offset in this way, it is less likely that debris in a flow of water entering inlet 24 will partially or completely block inlet 24.

Bypass plate 16 in the preferred embodiment is an essentially flat, circular plate 62 having a preferably integral raised ring 60 for compressive engagement with a conventional meter chamber. Bypass plate 16 may also have other means for engaging a preferred meter chamber, such as a central well 64 having sloping sides dimensioned to engage the preferred metering chamber.

Figure 2:
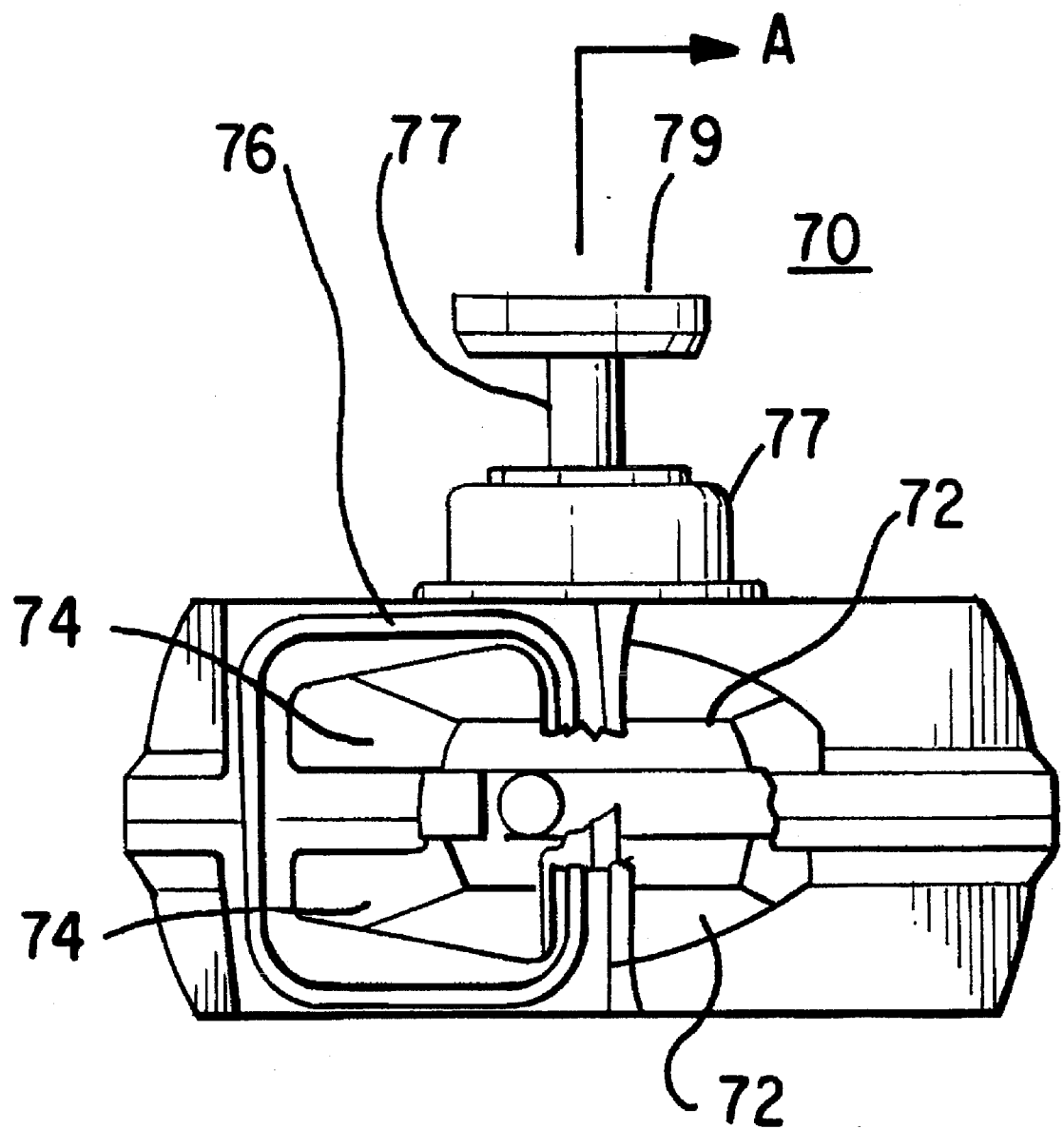
FIG. 2 is a partially sectioned elevational view of the inlet and outlet side of a ⅝" T-10 nutating disk metering chamber preferred for use in conjunction with the embodiment of the invention illustrated in FIG. 1.

A preferred metering chamber for 1" maincases is the ⅝" T-10 Schlumberger nutating disk meter chamber 70 illustrated in FIG. 2, which shows a view of the adjacent inlet ports 72 and outlet ports 74 of the meter. The meter chamber is also conventionally provided with an O-ring 76 for sealing engagement with an outlet. Outlet 22 of chamber housing 12 (not shown in FIG. 2) is dimensioned for sealing engagement with O-ring 76 and fluid communication with outlet ports 74. The assembly comprising the meter chamber and the inventive adapter, when installed within a maincase, provides a means for proportionately metering the water flow through the maincase with minimal head loss, while providing an essentially unobstructed flow of water that is independent of the metered flow. The particular meter chamber 70 shown in FIG. 2 is preferred because it can be readily adapted for proportional use in this application and because the dimensions of the meter chamber allow a suitably large passageway to be formed below by bypass plate 16 and bypass 14 in a 1" maincase for residential fire sprinkler applications.

Figure 3A:
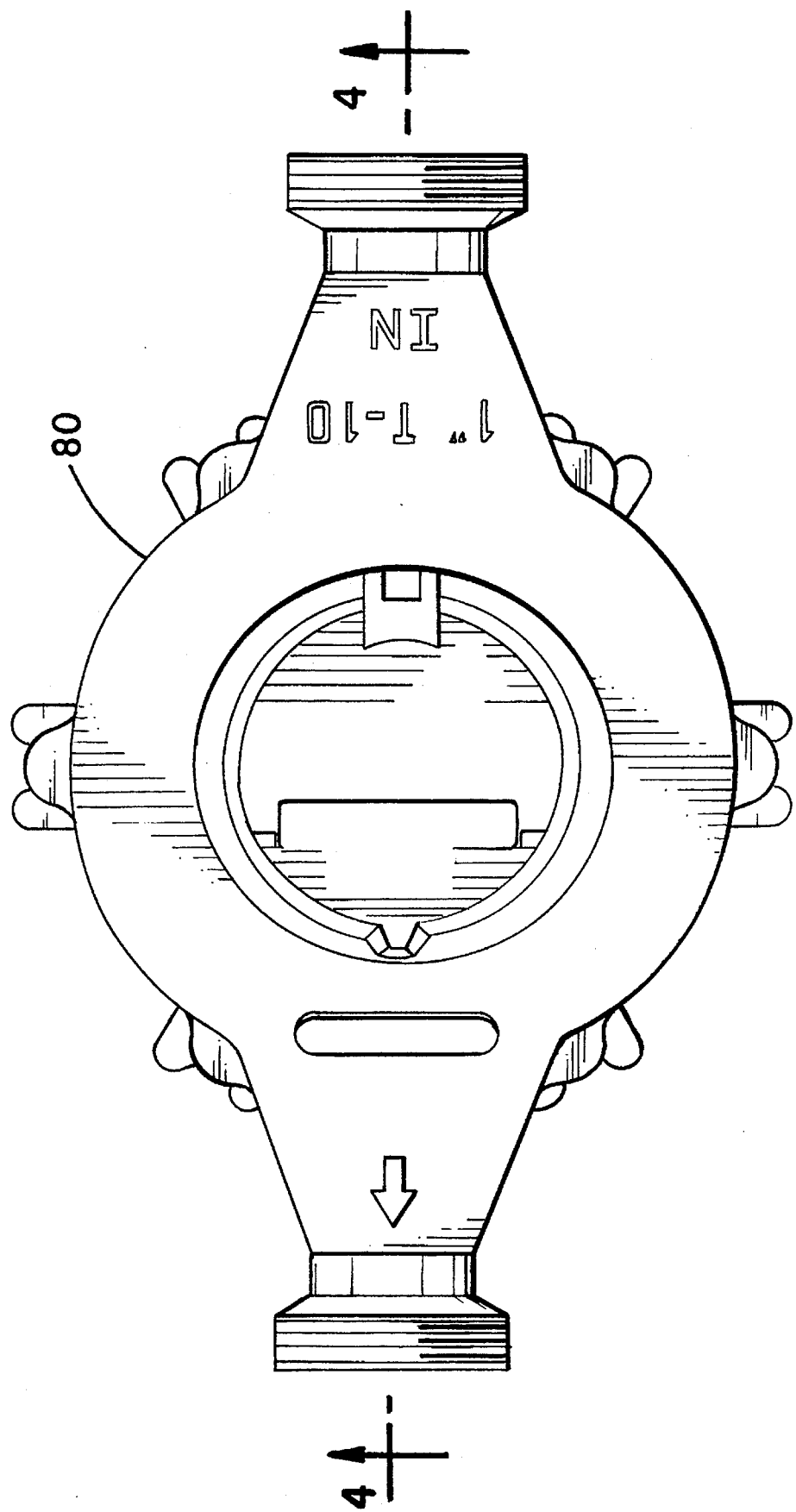
FIGS. 3A and 3B are top plan and side elevational views, respectively, of a meter maincase suitable for use in conjunction with the inventive adapter.
Figure 3B:
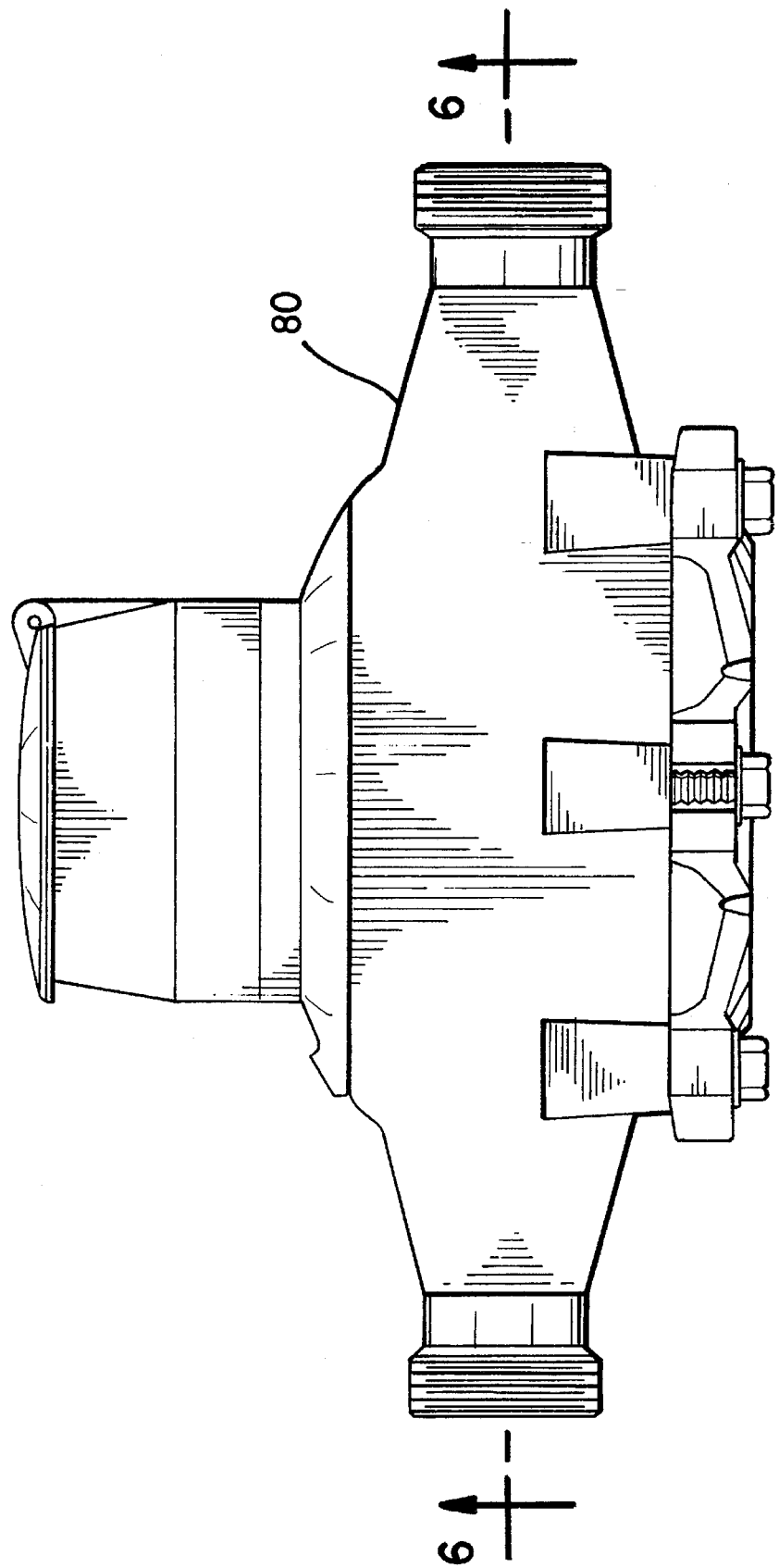
Figure 4:
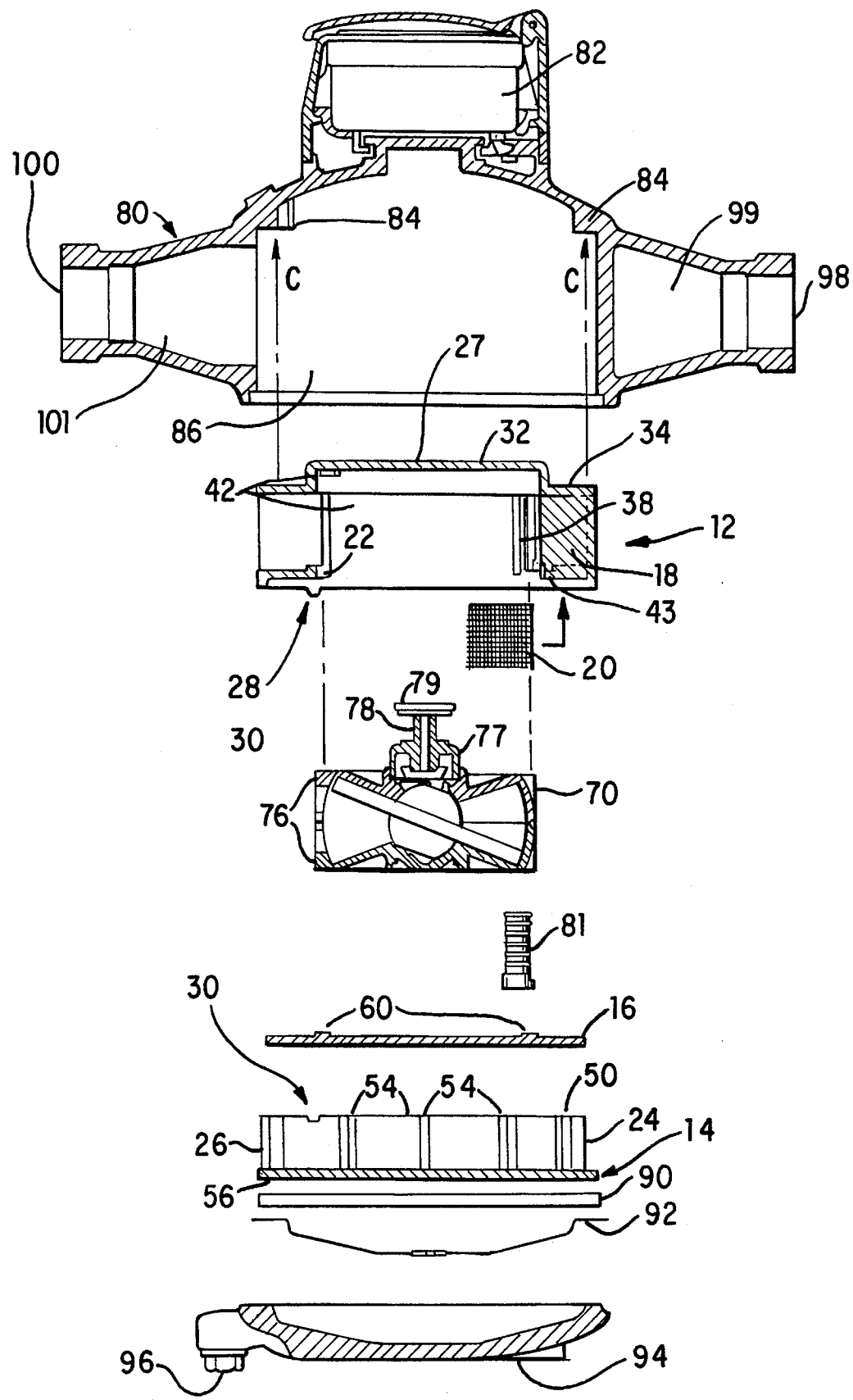
FIG. 4 is an exploded cross sectional view along section line 4 of FIG. 3A of an application of the preferred embodiment of the inventive adapter, showing its relationship with the various other components which are used in conjunction with the adapter to provide proportional flow metering of water for fire service sprinklers, while providing a substantially unimpeded flow path for a portion of the water flow.

FIG. 4 shows an exploded view along view line 4 of a complete adapter provided in a maincase 80 shown in top and side view in FIGS. 3A and 3B, respectively. The maincase 80 shown in FIG. 4 has a bottom opening 86, through which a preferred embodiment of adapter 10 and other associated components are inserted to provide a functioning proportional flow meter for fire service use. As shown in FIG. 4, circular shoulder 34 of chamber housing 12 rests on an internal shoulder 84 of maincase 80 as indicated by arrows C. Screen 20, which is preferably stainless steel, fits into the pair of guides 38 so as to provide a filter for inlet port 18. A plastic strainer 81, which is conventionally used in conjunction with the preferred T-10 meter 70, is seated in notch 43, and serves to compressionally seat O-ring 76 against outlet port 22. It will, of course, be recognized that alternate means to sealingly engage the outlet ports 74 of meter 70 and outlet port 22 of housing 12 may be provided.

Meter chamber 70 in the preferred embodiment rests against the surface of seating means 42 on ceiling 32 of chamber housing 12, while control block 77 engages opening 27 in the top of housing 12. For the preferred meter chamber 70, this allows drive shaft 78, which is mechanically coupled to a measuring element in meter chamber 70, to rotate a magnet 79 magnetically coupled to register 82. For the T-10 meter chamber shown, control block 77 and drive shaft 78 are lengthened somewhat to maintain the standard distance between the magnet 79 on the drive shaft and a corresponding magnet (not shown) in register 82. Water use can thus be recorded in a conventional manner, although register 82 must be specially calibrated to correctly register proportional flow. Bypass plate 16, which seats within the outer lip provided by outer wall 46 of chamber housing 12, closes off the metered upper passageway. The integral raised ring 60 provides a compression load on the meter chamber 70 and also chamber housing 12 when the entire structure is assembled.

Figure 5:
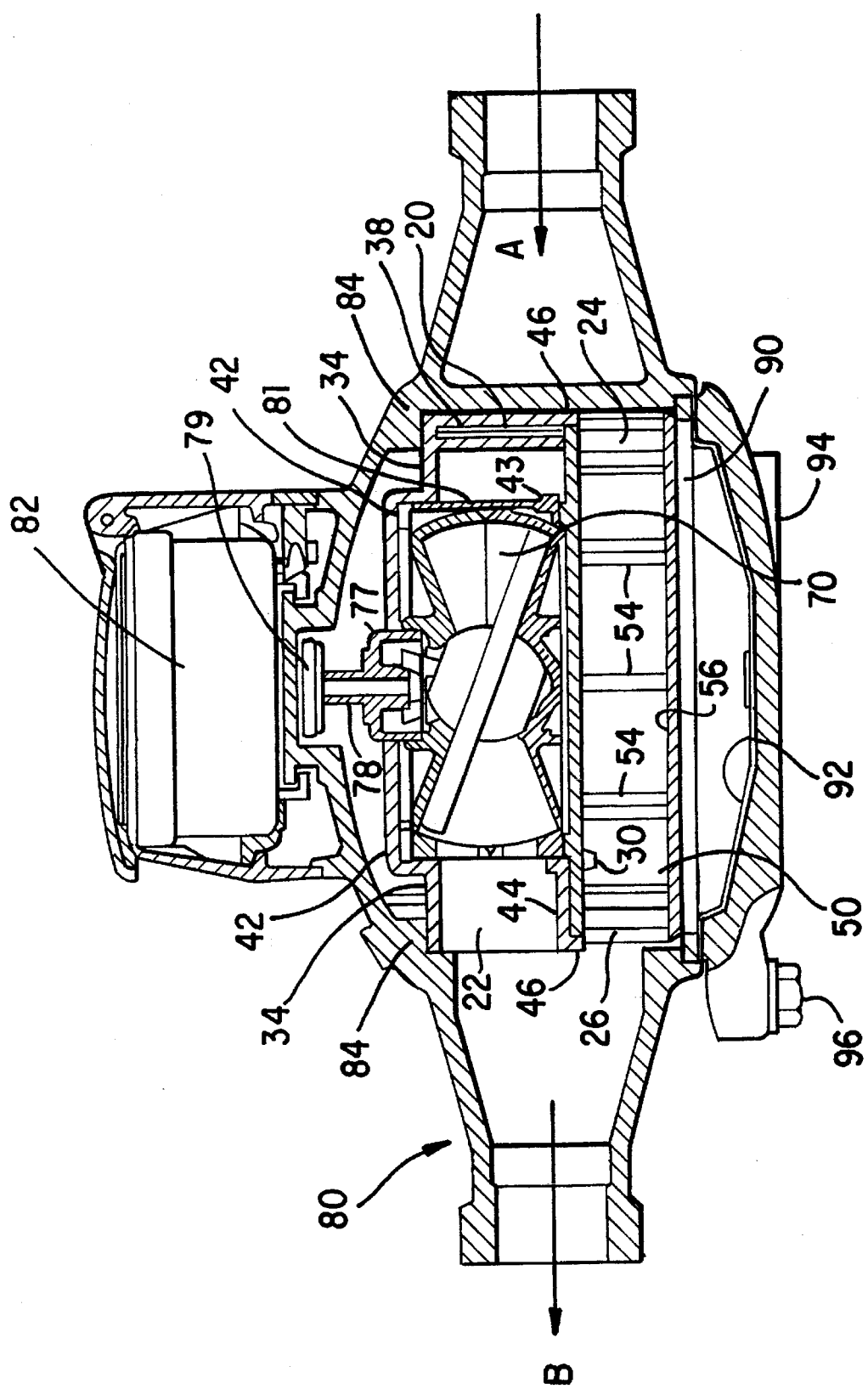
FIG. 5 is an assembled cut-away cross sectional view of the assembly shown in exploded form in FIG. 4.

Ribs 54 on walls 50 and 52 (the latter not shown in FIG. 4) on bypass 14 support bypass plate 16, while notches 30 along the rim of walls 50 and 52 hold the adapter assembly in alignment. A conventional gasket 90 and a liner 92 are preferably provided below circular plate 56 of bypass 14. Gasket 90 assists in sealing and compressing the assembly within maincase 80, while liner 92 prevents paint on the bottom cap 94 from contacting water. (Both gasket 90 and liner 92 would also be used if a full-size meter chamber were provided for maincase 80.) Finally, bottom cap 94 is attached to maincase 80 in a conventional manner using bolts 96, thereby closing and sealing the opening 86. A cut-away cross-sectional elevational view of a complete installation is shown in FIG. 5. It will be recognized that the assembled adapter, with the aid of gasket 90 or other comparable means, is dimensioned to fill the maincase in such a manner as to ensure that all water flowing through the maincase will flow through either the upper passageway defined by chamber housing 12 and bypass plate 16, or the lower passageway defined by bypass plate 16 and bypass 14. It will further be understood that the inlet port or ports of chamber housing 12 (together with any strainer or strainers, if any) is dimensioned to allow a sufficient fraction of the total flow of water to flow through a meter chamber enclosed within to allow at least approximately accurate proportional metering to be done by the meter chamber, and that the outlet port of chamber housing 12 is dimensional to sealingly engage the outlet port of the meter chamber to prevent water flowing through the chamber housing from bypassing the meter chamber. It will additionally be understood that the inlet and outlet port dimensions of the bypass are to be sufficiently large to allow a substantial flow of water to pass unimpeded through the lower passageway of the adapter, and also large enough to resist clogging by debris that may be present in the water flow.

The plan cross-sectional view of FIG. 6, (along view line 6 of FIG. 3B) will aid in understanding the flow of water through the inventive adaptor 10. Water enters maincase 80 through an inlet 98, as indicated by arrow A. This water enters internal inlet chamber 99, which is in fluid communication with an inlet opening 24 (not shown in FIG. 6) in the lower portion of adapter 10, and inlets 18 in the upper portion of adapter 10. Water entering inlets 18, a portion of which is indicated by arrows F1 through F4, must flow in a space around meter chamber 70 to enter meter inlet or inlets 72. Water entering inlet 72 is metered and caused to be registered by coupling means 79 (on the opposite side of meter chamber 70 in FIG. 6), which, in a preferred usage, is a rotating magnetic disk operatively engaged with the metering element, and which is also magnetically coupled to a register (not shown in FIG. 6). As indicated by arrow F5, water entering the meter chamber 70 flows out of outlet 22, which is sealingly engaged with outlet or outlets 74 of meter chamber 70 by means such as an O-ring 76. The inlet flow to and outlet flow from the meter are kept separated by additional means, including side walls 45 shown in FIG. 6. In internal outlet chamber 101, the flow of water leaving outlet 22 merges with the flow of water from outlet 26 from the essentially unobstructed bottom portion of the adaptor defined by bypass 14 and bypass plate 16 to form a single flow indicated by arrow F6. This flow exits through the maincase 80 outlet 100, as indicated by arrow B.

Head loss data was recorded for the preferred embodiment in which a ⅝" Schlumberger T-10 nutating disk meter is installed in the adapter, which is, in turn, installed in a standard 1" maincase. The measured head loss is considerably less with the inventive adapter when the meter chamber in it is blocked than if a conventionally installed 1" T-10 meter were used to measure all of the water flowing through the maincase and the 1" meter became blocked, as shown in Table I. For comparison purposes, the normal headloss at 50 GPM for an unlocked 1" T-10 meter is 8 PSI (GPM=gallons per minute; PSI=pounds per square inch).

To obtain the data in Table I, an adapter having the dimensions listed in Table II was tested. This embodiment of the adapter, in conjunction with the meter chamber specified above, causes the meter chamber to measure about 33% of the water passing through the maincase. Note that the dimensions of the bypass inlet and outlet openings are such as to provide openings resistant to clogging by debris that may exist in the flow of water in the fire service line.

TABLE I

| Residential Fire Service Head Loss | | | |
|---|---|---|---|
| 5/8" Meter in 1" Maincase Chamber locked | | 1" T-10 Meter in 1" Maincase Chamber locked | |
| GPM | PSI | GPM | PSI |
| 3 | .05 | 3 | 9.54 |
| 5 | .09 | 5 | 22.69 |
| 8 | .28 | 8 | 50.37 |
| 10 | .42 | 10 | 73.50 |
| 12 | .55 | 12 | 100.20 |
| 15 | .83 | 15 | 146.30 |
| 20 | 1.47 | 20 | 238.30 |
| 30 | 3.06 | 30 | 474.00 |
| 40 | 5.24 | 40 | 772.10 |
| 50 | 10.1 | 50 | 1127.20 |

TABLE II

| | |
|---|---|
| Inside diameter of chamber housing | 4.620 in. |
| Outside diameter of chamber housing | 4.860 in. |
| Total Height of chamber housing, to ceiling | 1.706 in. |
| Height of chamber housing, from lip to shoulder | 1.356 in. |
| Outlet port of chamber housing | 0.920 × 0.920 in. at meter |
| Inlet ports of chamber housing | 1.006 × 1.750 in. |
| Strainer | 2.06 × 1.09 in. No. 12 mesh, 0.023 dia. wire |
| Bypass plate diameters | 4.605 in. |
| Bypass plate thickness | 0.166 in. |
| Integral Bypass plate raised ring thickness (above plate) | 0.056 in. |
| Bypass diameter | 4.860 in. |
| Bypass height | 0.860 in. |
| Bypass vertical wall thickness | 0.120 in. |
| Ribs | 0.124 in. |
| from inside of bypass vertical wall × 0.120 in. wide, × 10 spaced at aprox. 30° spacings along walls | |
| Bypass inlet opening | 0.760 × 1.040 in. |
| Bypass outlet opening | 0.760 × 1.040 in. |

Register 82 may be calibrated by passing a known volume of water through maincase 80 and observing, with register 82, the response of meter chamber 70 to these known volumes. The observed response will be a response essentially similar to that expected with meter chamber 70 installed without the inventive adapter 10 in a maincase of the size for which meter chamber 70 is designed, but proportionately scaled by a constant which may be determined by experiment for a particular size maincase, meter chamber, and adapter. This calibration procedure should be repeated at several flow rates within the specified range of meter chamber 70 and the observed responses averaged. Steps can then be taken to calibrate the register, such as providing appropriately changed gear ratios. It should be noted, however, that the linearity of the scaling will be poor for weak flows, and thus, weak flows of water may not be registered correctly and should not be part of the averaged calibration. For the ⅝" meter chamber tested in the 1" maincase, calibration rates between 3 and 50 GPM are satisfactory (Because the meter chamber and adapter tested above measures about 33% of the water passing through the maincase, the calibration of the register requires that the register indicate three times the volume that it would otherwise show for a positive displacement meter of ⅝" size.). The amount of water lost by flow rates smaller than those that can be accurately measured using the inventive adapter will be small, and will be offset by the capability of the inventive adapter to permit large flows to be metered with very low head loss and little likelihood of blockage in the event a flow of water is needed during a fire.

It will be recognized that, once a register is calibrated for a particular size and type of meter chamber housed within an adapter of known dimensions for use within a maincase of known dimensions, the calibration may be used for other registers without repeating the volume measurement test for each individual meter chamber, adapter, maincase, and register.

Throughout this description, a specific preferred embodiment has been described in detail. However, many modifications to this embodiment will be evident to those skilled in the art within the spirit of the invention. For example, although the preferred embodiment of the adapter is designed to accommodate the ⅝" T-10 Schlumberger nutating disk meter, it will be recognized by one skilled in the art that other conventional meters with any type of conventional measuring element may be used, for example, oscillating piston and multijet (paddle wheel) meters, if the chamber housing, bypass, and bypass plate are appropriately dimensioned and appropriate seating means are provided. Moreover, it will also be evident to one skilled in the art that the invention is not limited to ⅝" meter assemblies and 1" maincases, but rather may be readily scaled to meet other size and flow requirements, so long as an adequate unobstructed flow can be accommodated for the intended purpose in the lower passageway formed by the bypass plate 16 and bypass 14. Also, one skilled in the art will readily be able to modify the various engagement and alignment details that may be necessary to accommodate other meter housings and to fit into other maincases. It should additionally be evident to one skilled in the art that the subassembly comprising bypass plate 16 and bypass 14 could be provided in alternate configurations that provide an equivalent subassembly, or even as an integral subassembly, provided that an essentially unobstructed passageway is provided between ports 24 and 26. Also, the internal details of chamber housing 12 (i.e., guides 38, the bottom wall 44 of outlet channel 22, and internal walls 36 and 40) may be extended up to the rim of enveloping side wall 46 of chamber housing 12, and ribs 54 recessed from the rims of walls 50 and 52 of bypass 14 by the thickness of bypass plate 16, thereby allowing bypass plate 16 to seat within a lip formed by walls 50 and 52 of bypass 14 rather than within enveloping side wall 46 of chamber housing 12.

This list of possible modifications is not intended to be exhaustive, and many other modifications will be readily apparent to one skilled in the art. Thus, the scope of the invention should be determined by reference to the claims below rather than to the specific details of the embodiment described herein.

We claim:

1. An adapter for a meter chamber, suitable for use for proportionally metering a flow of water through a maincase installed in a residential fire service sprinkler line, the adapter comprising:
   (a) means for proportionately dividing an inlet flow of water into a separate first flow and a separate second flow within a maincase;
   (b) means for joining said first flow and said second flow into an outlet flow within said maincase;
   (c) means for engaging a meter chamber within the path of said first flow so that essentially all of said first flow is directed through said meter chamber before said first flow is joined with said second flow into said outlet flow; and
   (d) means for passing said second flow essentially unimpeded from said means for dividing to said means for joining.

2. An adapter for a meter chamber, suitable for use for proportionally metering a flow of water through a maincase installed in a residential fire service sprinkler line, the adapter comprising:
   (a) a chamber housing dimensioned to receive a meter chamber and having a first inlet aperture and a first outlet aperture for allowing a first flow of water to flow through a received meter chamber, said chamber housing including
      (i) a ceiling having an outer perimeter;
      (ii) a first outer wall depending from the outer perimeter of said ceiling and having a bottom rim and an inner surface;
      (iii) means disposed within said chamber housing for seating a meter chamber received therein;
   (b) a bypass having a second inlet aperture and a second outlet aperture for allowing a second flow of water to pass through said bypass, said bypass including:
      (i) a floor;
      (ii) a second outer wall extending upward from said floor and dimensioned for mating engagement with said bottom rim of said first outer wall, said second outer wall having a top rim and an inner surface; and
   (c) a bypass plate for insertion between said chamber housing and said bypass, for providing fluid isolation between said first flow of water and said second flow of water.

3. The adapter of claim 2, wherein
   (a) said chamber housing further comprises means disposed within said chamber housing and recessed from said bottom rim of said first outer wall for supporting said bypass plate in cooperation with an inner surface of said first outer wall proximate said bottom rim; and
   (b) said bypass further comprises means disposed within said bypass for supportively engaging said bypass plate within said chamber housing and said inner surface of said first outer wall proximate said bottom rim of said first outer wall.

4. The adapter of claim 3, wherein a first gap in said second outer wall defines said second inlet aperture, and a second gap in said second outer wall defines said second outlet aperture.

5. The adapter of claim 3, wherein said bypass includes a third outer wall extending upwardly from said floor, a first gap between said second outer wall and said third outer wall defining said second inlet aperture, and a second gap between said second outer wall and said third outer walls disposed at an offset from a position diametrically opposite said first gap defining said second outlet aperture.

6. The adapter of claim 3, wherein said ceiling of said chamber housing is provided with an aperture to engage a control block extending from said meter chamber for allowing a drive shaft from said meter chamber to extend through said aperture.

7. The adapter of claim 3, wherein said bypass is provided with apertures in said floor to relieve pressure.

8. The adapter of claim 3, wherein said means disposed within said bypass for supportively engaging said bypass plate within said chamber housing and said inner surface of said outer wall comprise ribs disposed on an inner surface of said second outer wall.

9. The adapter of claim 3, wherein said chamber housing includes means for sealingly engaging an O-ring between said first outlet aperture and an outlet of a received meter chamber.

10. The adapter of claim 3, wherein said chamber housing includes means for engaging a screen in said path of flow of water through said first inlet aperture to prevent debris in a flow of water through said first inlet aperture from reaching a meter chamber disposed within said chamber housing.

11. The adapter of claim 3, wherein said bypass plate is provided with means for compressively engaging a meter chamber within said chamber housing.

12. The adapter of claim 11, wherein said means for compressive engagement comprises a raised portion of a surface of said bypass plate.

13. The adapter of claim 3, wherein said bypass plate and bypass are unitary, said bypass plate forming a top wall of said bypass.

14. The adapter of claim 3, wherein said chamber housing ceiling comprises a shoulder for seating against an inner shoulder of a maincase.

15. The adapter of claim 3 wherein said chamber housing is dimensioned to receive a ⅝" positive displacement meter, and [the]said assembled adapter is dimensioned to fit within a 1" maincase.

16. The adapter of claim 3, wherein at least one of said chamber housing, bypass plate, and bypass are comprised of a plastic material.

17. A method of proportionally metering a volume of water flowing through a maincase comprising:
(a) seating a positive displacement meter chamber in a first passageway of an adapter having two passageways, including a second passageway, said first passageway including means for passing a first flow of water through said positive displacement meter chamber and said second passageway for passing a flow of water essentially unimpeded therethrough;
(b) inserting said adapter including said seated positive displacement meter into a maincase including a register so that said positive displacement meter is operatively coupled to said register; and
(c) calibrating said register so that said register records the amount of water flowing through said maincase.

18. A method of proportionally metering a volume of water flowing through a maincase comprising:
(a) seating a positive displacement meter chamber in a first passageway of an adapter having two passageways, including a second passageway, said first passageway including means for passing a first flow of water through said positive displacement meter chamber and said second passageway for passing a flow of water essentially unimpeded therethrough;
(b) inserting said first adapter including said seated positive displacement meter into a maincase including a register so that said positive displacement meter is operatively coupled to said register, so that all flow through said first passageway passes through said positive displacement meter; and
calibrating said register proportionally with respect to the flow of water through said first passageway and said second passageway, whereby the measurement by said register of the volume of water passing through said first passageway provides a reading of the total volume of water passing through said maincase.

* * * * *